United States Patent
He et al.

(10) Patent No.: US 9,979,618 B2
(45) Date of Patent: *May 22, 2018

(54) DETECTING AND ALERTING PERFORMANCE DEGRADATION DURING FEATURES RAMP-UP

(71) Applicant: Microsoft Technology Licensing, LLC, Redmond, WA (US)

(72) Inventors: David Q. He, Cupertino, CA (US); Ruixuan Hou, Sunnyvale, CA (US); Michael C. Chang, Fremont, CA (US); Badrinath Sridharan, Saratoga, CA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/287,152

(22) Filed: Oct. 6, 2016

(65) Prior Publication Data

US 2017/0026258 A1     Jan. 26, 2017

Related U.S. Application Data

(62) Division of application No. 14/951,026, filed on Nov. 24, 2015, now Pat. No. 9,479,408, which is a division
(Continued)

(51) Int. Cl.
*G06F 15/16* (2006.01)
*H04L 12/26* (2006.01)
(Continued)

(52) U.S. Cl.
CPC .............. *H04L 43/08* (2013.01); *G06F 9/542* (2013.01); *G06F 11/0709* (2013.01);
(Continued)

(58) Field of Classification Search
CPC .... H04L 29/08072; H04L 29/06; H04L 67/02
(Continued)

(56) References Cited

U.S. PATENT DOCUMENTS

| 8,112,471 B2 | 2/2012 | Wei |
| 8,856,027 B2 | 10/2014 | Khunteta |

(Continued)

FOREIGN PATENT DOCUMENTS

| WO | WO 01/84273 A2 | 11/2001 |
| WO | WO 2011/097328 A2 | 8/2011 |
| WO | WO 2012/115981 A1 | 8/2012 |

OTHER PUBLICATIONS

European Patent Office, "Search Report" in application No. PCT/US2016/018938, dated Jun. 13, 2016, 13 pages.
(Continued)

*Primary Examiner* — Khanh Dinh
(74) *Attorney, Agent, or Firm* — Hickman Palermo Becker Bingham LLP

(57) ABSTRACT

Computerized techniques are described for detecting performance degradation during features ramp up. A first version of web content is sent to first client devices. The first version of the web content lacks a particular feature. First performance data that indicates performance of each first client device with respect to processing the web content is received. A second version of the web content is sent to second client devices. The second version of the web content has the particular feature. Second performance data that indicates performance of each second client device with respect to processing the web content is received. The first performance data is compared with the second performance data to determine a difference between a processing metric
(Continued)

associated with the first version of the web content and a processing metric associated with the second version of the web content.

20 Claims, 8 Drawing Sheets

Related U.S. Application Data of application No. 14/669,502, filed on Mar. 26, 2015, now Pat. No. 9,225,625.

(51) Int. Cl.

| | | |
|---|---|---|
| *G06F 9/54* | (2006.01) | |
| *H04L 29/06* | (2006.01) | |
| *H04L 29/08* | (2006.01) | |
| *G06F 11/34* | (2006.01) | |
| *G06F 11/07* | (2006.01) | |
| *H04L 12/24* | (2006.01) | |

(52) U.S. Cl.
CPC ...... *G06F 11/0757* (2013.01); *G06F 11/0766* (2013.01); *G06F 11/3419* (2013.01); *H04L 29/06* (2013.01); *H04L 29/08072* (2013.01); *H04L 41/5009* (2013.01); *H04L 67/02* (2013.01); *G06F 11/3414* (2013.01); *G06F 2201/875* (2013.01); *H04L 41/142* (2013.01); *H04L 43/0852* (2013.01)

(58) Field of Classification Search
USPC .......................... 709/203, 220, 224, 227, 232
See application file for complete search history.

(56) References Cited

U.S. PATENT DOCUMENTS

| | | | | |
|---|---|---|---|---|
| 9,225,625 B1* | 12/2015 | He | ........................ | G06F 9/542 |
| 9,241,044 B2* | 1/2016 | Shribman | ............... | H04L 67/06 |
| 9,336,234 B2* | 5/2016 | Grimm | ................... | H04L 67/42 |
| 9,479,408 B2* | 10/2016 | He | ........................ | G06F 9/542 |
| 9,509,764 B1* | 11/2016 | Kolam | ................... | H04L 67/02 |
| 9,515,934 B2* | 12/2016 | Rolette | ............... | H04L 43/0882 |
| 9,521,133 B2* | 12/2016 | Chu | ........................ | G06F 21/128 |
| 9,769,321 B1* | 9/2017 | Petit-Huguenin | ... | H04M 7/0084 |
| 2002/0184363 A1 | 12/2002 | Viavant et al. | | |
| 2003/0172163 A1 | 9/2003 | Fujita | | |
| 2008/0085729 A1* | 4/2008 | Lira | ........................ | H04L 51/38 455/466 |
| 2008/0104224 A1 | 5/2008 | Litofsky et al. | | |
| 2009/0163189 A1* | 6/2009 | Gil | ................... | G06F 17/30896 455/414.3 |
| 2010/0088411 A1 | 4/2010 | Litofsky et al. | | |
| 2011/0083031 A1 | 4/2011 | Khunteta | | |
| 2011/0137973 A1 | 6/2011 | Wei | | |
| 2011/0307808 A1* | 12/2011 | Giambalvo | ........... | G06F 9/4443 715/760 |
| 2012/0047444 A1* | 2/2012 | Adar | ................... | G06F 17/3089 715/745 |
| 2012/0226804 A1 | 9/2012 | Raja | | |
| 2013/0054792 A1 | 2/2013 | Sharaf | | |
| 2013/0166634 A1 | 6/2013 | Holland | | |
| 2016/0285714 A1 | 9/2016 | He et al. | | |

OTHER PUBLICATIONS

European Claims in application No. PCT/US2016/018938, dated Jun. 2016, 3 pages.

He, David, "Monitor and Improve Web Performance Using RUM Data Visualization", What Data to Collect, Process, and Visualize, Linkedin Engineering, dated Sep. 19, 2014, 6 pages.

International Preliminary Examining Authority, "Written Opinion" in application No. PCT/US2016/018938, dated Apr. 27 2017, 9 pages.

Current Claims in application No. PCT/US2016/018938, dated Apr. 2017, 4 pages.

U.S. Appl. No. 14/669,502, filed Mar. 26, 2015, Notice of Allowance, dated Aug. 27, 2015.

U.S. Appl. No. 14/951,026, filed Nov. 24, 2015, Notice of Allowance, dated Jul. 26, 2016.

* cited by examiner

DETECTING AND ALERTING PERFORMANCE DEGRADATION DURING FEATURES RAMP-UP

CROSS-REFERENCE TO RELATED APPLICATIONS; BENEFIT CLAIM

This application is a Divisional of U.S. patent application Ser. No. 14/951,026, filed Nov. 24, 2015, which is a Divisional of U.S. patent application Ser. No. 14/669,502, filed Mar. 26, 2015 (now U.S. Pat. No. 9,225,625); the entire contents of these related applications are hereby incorporated by reference for all purposes as if fully set forth herein. The applicants hereby rescind any disclaimer of claim scope in these related applications or the prosecution history thereof and advise the USPTO that the claims in this application may be broader than any claim in these related applications.

FIELD OF THE DISCLOSURE

The present disclosure relates to application servers and, more particularly, to detecting and alerting performance degradation during features ramp up.

BACKGROUND

Despite laboratory testing, the performance impact of a new web application feature may be difficult to predict prior to release. One approach to tracking performance of a new web application feature is to focus on the impact that feature may have on servers that provide the web application. However, the impact that the new feature may have on client devices is entirely ignored.

One approach to monitoring performance degradation is to compare overall performance data as observed before and after general release of a new feature. However, this approach is not well suited to sophisticated deployment techniques. Additionally, this approach would be unaware that some application users may be served a variant of an application while other simultaneous users are not served the variant.

A result of such an approach is that observation of performance degradation of a not widely used variant may be lost within statistical measurements of a greater audience of a generally available application. An inability to isolate variant performance is exacerbated by the possibility of a separate variant for each of multiple new features.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Computerized techniques are described herein for detecting performance degradation during features ramp up. In an embodiment, a computer sends a first version of web content to first client devices. The first version of the web content does not include a particular feature. The computer receives, from each client device of the first client devices, first performance data that indicates performance of the client device with respect to processing the web content. The computer sends a second version of the web content to second client devices that is different than the first client devices. The second version of the web content includes the particular feature. The computer receives, from each client device of the second client devices, second performance data that indicates performance of the client device with respect to processing the web content. The computer compares the first performance data with the second performance data to determine a difference between a processing metric associated with the first version of the web content and a processing metric associated with the second version of the web content.

In a related embodiment, a deployment having a feature and client instrumentation to measure and report load time of web content that has the feature is received. The feature is initially disabled. The feature is enabled for a, perhaps initially empty, subset of client users. Client users are repeatedly added to the subset. Timing reports from the client instrumentation are received. Each report has a content load duration and a classifier of a client user. The classifier is processed to determine whether the feature is enabled for the client user. Based on the timing reports, a degradation degree is calculated that statistically quantifies an additional duration that clients spend loading the web content if the feature is enabled for the client user. An alert is sent if the degradation degree exceeds a threshold.

System Overview

Figure 1:
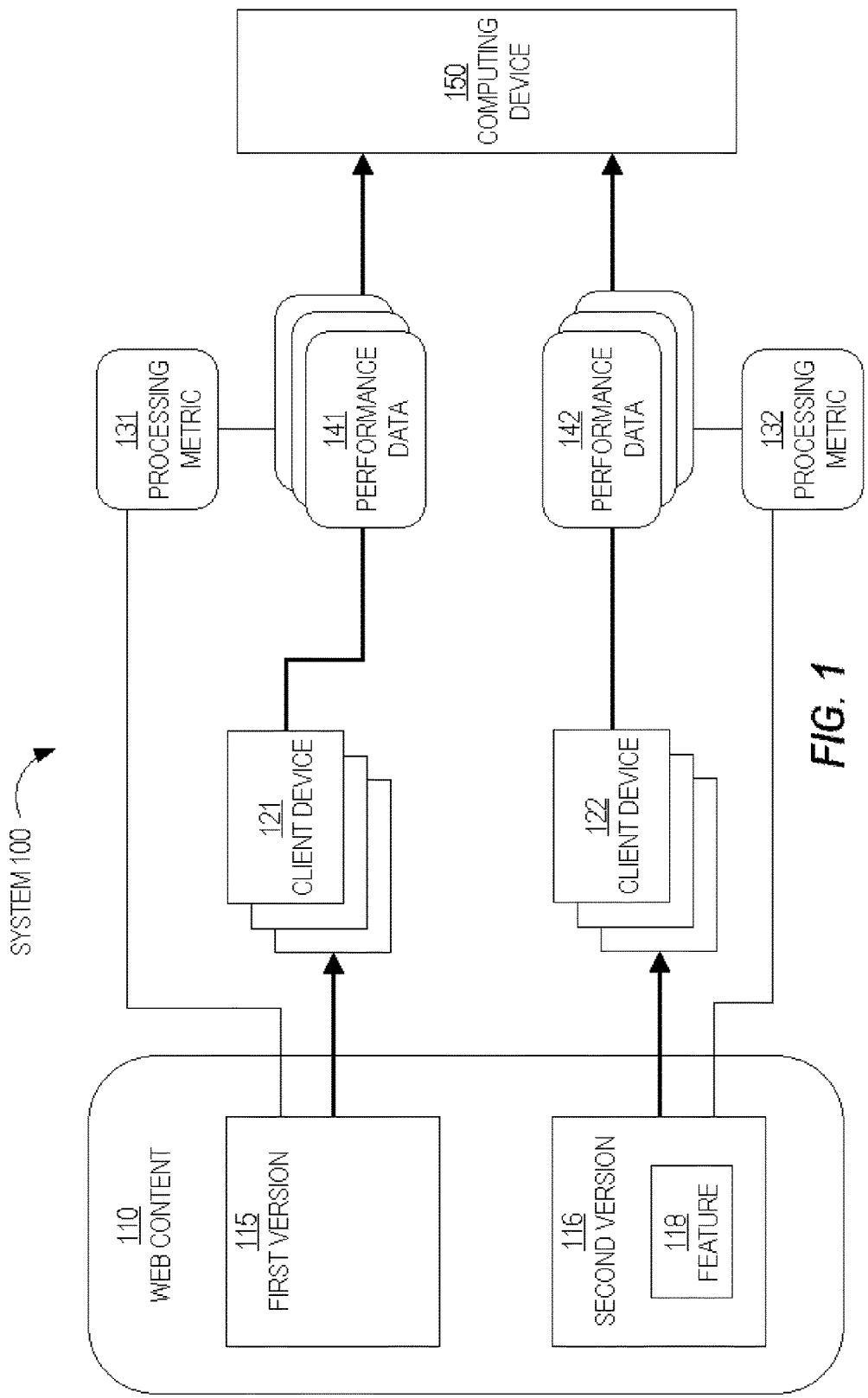
FIG. 1 is block diagram that depicts a web system for detecting performance degradation during features ramp up, in an embodiment.

FIG. 1 is a block diagram that depicts a web system 100 for detecting performance degradation during releases of features, in an embodiment. Web system 100 includes web content 110, client devices 121-122, and computing device 150. Computing device 150 may be a rack server or other networked computer configured to receive and process performance telemetry.

Each of client devices 121-122 may be a personal computer (PC), a smartphone, or any other networked computer capable of hosting a web client application, such as a web browser or a dedicated client application, that loads web content and sends performance data that regards the loading. Each of client devices 121-122 may be representative of a group of many client devices.

Web content 110 is a document that contains content, such as hypertext markup language (HTML). The content of web content 110 may be dynamically generated or static. Copies of web content 110 may be sent to client devices by, in this example, a web server hosted by a server computer (not depicted in FIG. 1). Each of client devices 121-122 sends a request for web content 110 to the web server over a communication network such as a local area network or an internetwork such as the global Internet.

Web content 110 has two versions that the web server may send in response to a request from a client device. These two versions differ according to a feature. First version 115 does not have feature 118. Second version 116 has feature 118. Although only one web page, two versions, and one feature are shown, an embodiment may have more of these components.

Feature 118 may be data that affects a visual artifact such as a widget or a decoration, a behavior such as a script, a combination of these, or any other meaningful difference in the content of web content 110 whose presence can impact the performance of a client device.

What mechanism causes the performance impact depends on the implementation of feature 118. Feature 118 may include more content that makes second version 116 a bigger payload to generate, transfer, and load. Feature 118 may add behaviors that make second version 116 computationally more expensive to load. Alternatively, feature 118 may improve the performance of second version 116.

Which version of web content 110 is sent by the web server may depend on which of client devices 121-122 issues the request. Criteria that the web server uses to choose which version to send depends on the implementation. However, for continuity of user experience, the web server may be configured to repeatedly send the same version in response to repeated requests from a same client device. In this example, client device 121 receives first version 115, and client device 122 receives second version 116. Sequential order of delivery by the web server of versions 115-116 is not necessarily imposed. The web server may concurrently send content to clients 121-122 and other clients.

Because client devices 121-122 receive different versions of web content 110, even under otherwise identical conditions, the performance of client devices 121-122 while processing web content 110 may differ. An embodiment may observe this performance difference. In this example, the performance difference is observed by computing device 150, which receives performance data from client devices 121-122 over a communication network such as the global Internet.

During operation, client device 121 loads first version 115 and then sends performance data 141, which regards that loading, to computing device 150. Likewise, client device 122 loads second version 116 and then sends performance data 142, which regards that loading, to computing device 150.

Because many other client devices may receive and process either of versions 115-116, computing device 150 receives performance data 141-142 from many client devices. Computing device 150 compares performance data 141 with performance data 142 to determine a difference between processing metrics 131-132, which respectively regard versions 115-116.

Processing metrics 131-132 may measure computational effort. For example, computing device 150 may determine that processing of second version 116 consumes more clock time, processor cycles, memory, or energy. Computing device 150 may determine that processing of second version 116 causes more virtual memory swapping, client cache thrashing, or disk usage.

Processing metrics 131-132 may instead measure human factors. For example, computing device 150 may determine that processing of second version 116 causes more screen flicker or induces more voluntary abandonment by a user of an artifact such as a web page or a virtual shopping cart.

With the difference between processing metrics 131-132 determined, decisions based on the difference may be made. A tactical decision may be automatic, such as alerting a significant difference. A tactical decision may be manual, such as ramping down or redefining feature 118. An extreme difference may be grounds for a strategic decision, such as withdrawal of feature 118 or delay of an application release.

Process Overview

Figure 2:
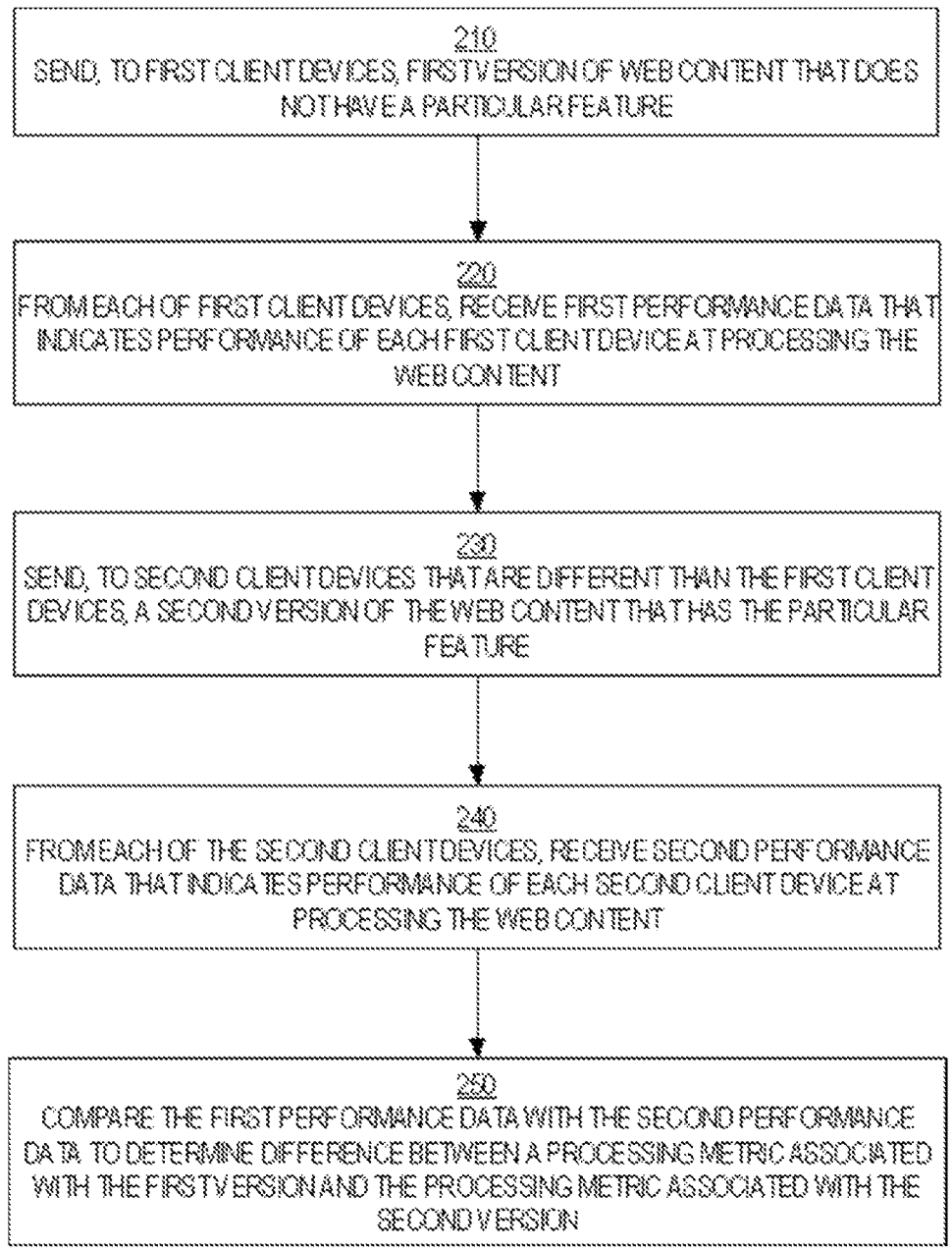
FIG. 2 is a flow diagram that depicts a process that detects performance degradation during features ramp up, in an embodiment.

FIG. 2 is a flow diagram that depicts actions performed to detect performance degradation during features ramp-up, in an embodiment. Although these actions are discussed with reference to web system 100, these actions may be performed by other embodiments.

In step 210, web system 100 sends first version 115 of web content 110 to a first plurality of client devices, including client device 121. First version 115 does not include feature 118. Sending of web content 110 to a client device may be in response to a request by that client device. However, an implementation need not involve a request. The sending may occur according to a transport protocol such as hypertext transfer protocol (HTTP).

In step 220, computing device 150 receives, from each client device of the first plurality of client devices, performance data 141 that indicates performance of each of those client devices with respect to processing first version 115. Client device 121 may have a web browser or a dedicated client application that executes a script included in web content 110. The script may gather performance data such as time profiling and resource consumption. Client device 121 may have a dedicated application instead of a web browser and script. In either case, performance data may be sent according to a transport protocol, such as HTTP.

Steps 230 and 240 proceeds similar to respective steps 210 and 220. However, the first plurality of client devices, first version 115, and performance data 141 are not involved. Instead, performance data 142, second version 116, and a second plurality of client devices, including client device 122, respectively perform similar roles.

Finally in step 250, computing device 150 compares performance data 141 with performance data 142 to determine a difference between processing metric 131 associated with first version 115 and processing metric 132 associated with second version 116. For example, computing device 150 may determine that processing of second version 116 consumes more computational resources or otherwise impacts a user experience.

Alert Overview

Figure 3:
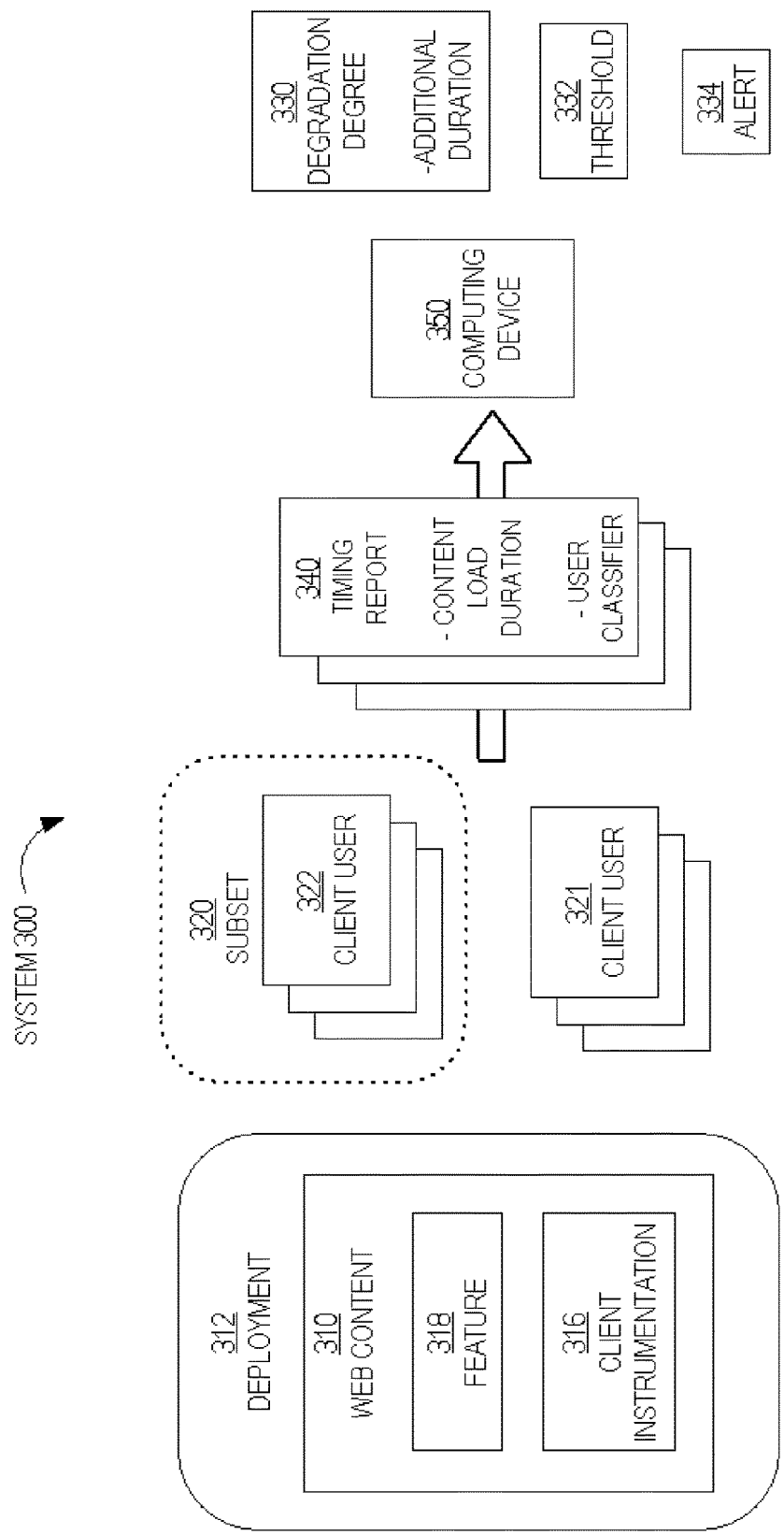
FIG. 3 is a block diagram that depicts a web system for detecting and alerting performance degradation during features ramp up, in an embodiment.

FIG. 3 is a block diagram that depicts a web system 300 for alerting performance degradation during releases of features, in an embodiment. Web system 300 may be an implementation of web system 100, although web system 100 may have other implementations. Web system 300 includes deployment 312, client users 321-322, and computing device 350.

Computing device 350 may be an implementation of computing device 150, although computing device 150 may have other implementations. Computing device 350 may be a rack server or other networked computer configured to receive and process performance telemetry and send alerts.

Each of client users 321-322 may use a web browser or a dedicated client application running on a client device, such as a PC or smartphone, which may be an implementation of client devices 121-122. Each of client users 321-322 may be representative of many similar client users.

Although in this example each of client users 321-322 is an end user of a web browser or a dedicated client application, other embodiments may substitute other types of clients in place of client users 321-322. For example in another embodiment, any of client users 321-322 may be an end user of a dedicated application that is not a web browser but nonetheless acts as a client of a web application.

In yet another example, any of client users 321-322 is not an end user but rather a user agent. The user agent may be either software, such as a web browser or a dedicated client application, or hardware, such as a mobile device. An embodiment that implements client users 321-322 as user agents might be unable to discriminate amongst different end users that share a user agent, such as a laptop of a household. Likewise, such an embodiment may be unable to recognize an end user that uses different user agents, such as a workstation computer in an office and a smartphone while commuting. Deployment 312 may be a software release, such as a web application installation. Deployment 312 runs on a web server or other middleware that is hosted by a server computer, such as a rack server. Deployment 312 includes web content 310, which may be an implementation of web content 110. Web content 310 includes feature 318 and client instrumentation 316.

Although only one feature is shown, web system 300 may have many features. For example, a web page may have many features, and a feature may be part of many web pages. Web system 300 may independently measure and report performance degradation of each of many distinct features, even if the distinct features are at different stages of ramp up.

Feature 318 may be an implementation of feature 118 and may include artifacts, such as scripts and HTML elements. Feature 318 is initially disabled. While feature 318 is disabled, its implementation machinery is either not delivered to web clients or is delivered but suppressed so as not to execute or render in a web client.

Client instrumentation 316 includes logic, such as JavaScript, that a web client may execute to measure a page load time of web content 310. Page load time is a performance metric for evaluating a user experience during release of a feature. Delay of page loading by one second may cause decreases in page views, customer satisfaction, and sale conversions of approximately ten percent. FIG. 3 shows client instrumentation 316 as part of web content 310, which is appropriate if client instrumentation 316 is embeddable, such as JavaScript in a web page. However, client instrumentation 316 may instead be logic deployed within a dedicated client application and perhaps installed along with the dedicated client application before web content 310 is sent.

Client instrumentation 316 may measure other dimensions such as memory usage or screen flicker. After web content 310 has loaded in a web client, client instrumentation 316 generates and sends timing report 340 to computing device 350.

Timing report 340 includes a page load duration that indicates an amount of time spent loading web content 310 into a web client. Timing report 340 also includes a user classifier that either directly or indirectly indicates whether feature 318 is enabled for a client user. Timing report 340 may include other metrics such as memory usage or screen flicker.

If feature 318 is enabled for a client user, then computing device 350 classifies the client user as a member of subset 320. The user classifier may be a flag that directly indicates that the client user is in subset 320. Alternatively, the user classifier may be data that computing device 350 may process to determine whether a client user is in subset 320 and has feature 318 enabled. For example, the user classifier may be a user identifier, a browser fingerprint, a device fingerprint, an internet protocol (IP) address, a session identifier, or an individualized cookie. Initially subset 320 may be empty, in which case feature 318 is disabled for all client users. At times web system 300 may select client users for inclusion in subset 320 and enablement of feature 318.

In operation, computing device 350 receives many timing reports 340 from many client users 321-322, of which only some are in subset 320. Computing device 350 processes the many timing reports 340 to calculate a degradation degree 330 that statistically quantifies the extra time that web clients spend loading web content 310. For example the degradation degree may measure a difference between an average time spent loading web content 310 when feature 318 is enabled versus an average time when feature 318 is disabled. If computing device 350 detects that the degradation degree exceeds a threshold 332, then computing device 350 sends an alert 334.

Alert Process

Figure 4:
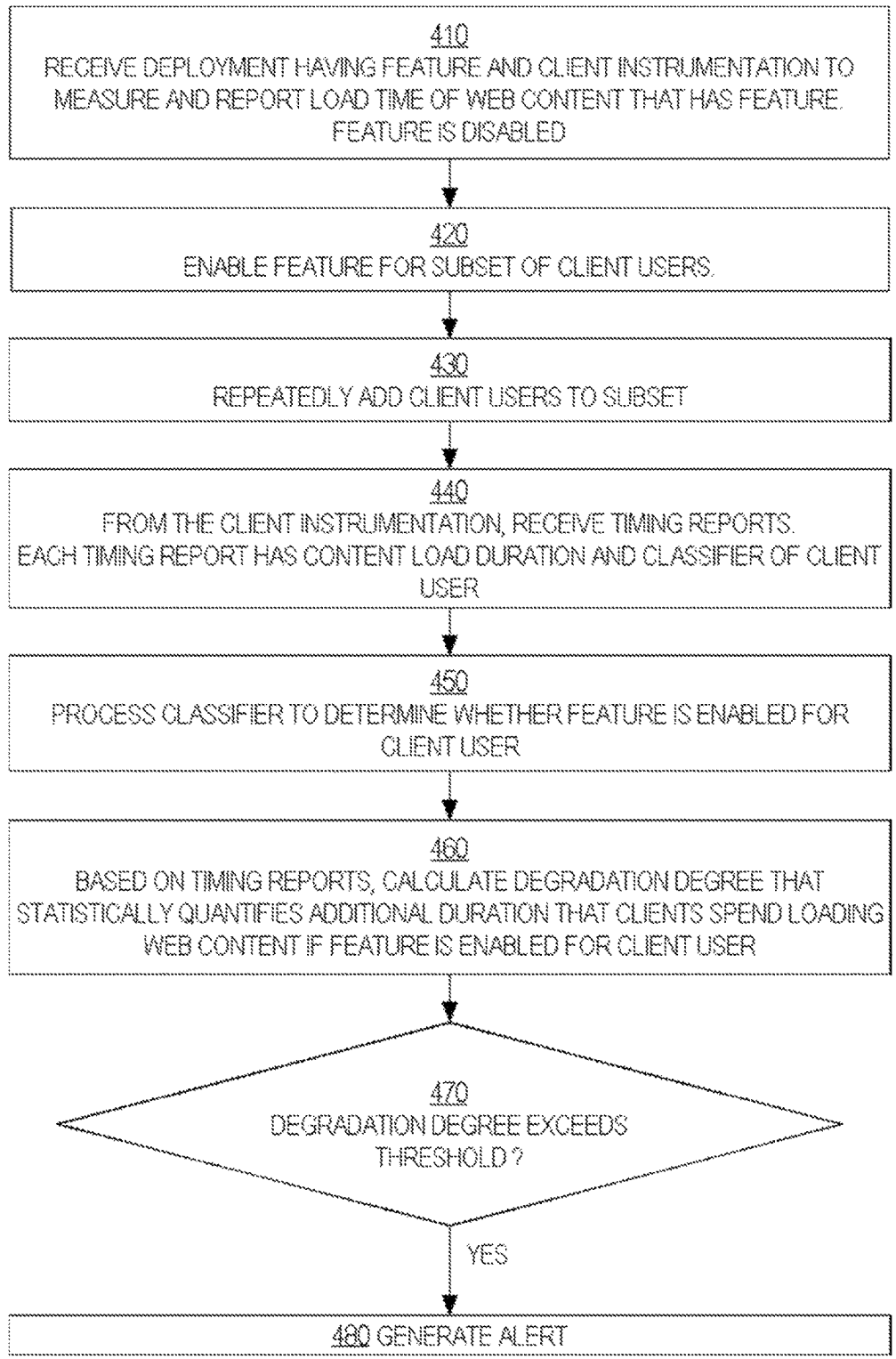
FIG. 4 is a flow diagram that depicts a process that detects and alerts performance degradation during features ramp up, in an embodiment.

FIG. 4 is a flow diagram that depicts actions performed to alert performance degradation during features ramp-up, in an embodiment. Although these actions are discussed with reference to web system 300, these actions may be performed by other embodiments.

In step 410, a deployment host, such as a web server, receives and serves deployment 312 having feature 318 and client instrumentation 316 that, when executed by a client device, such as in a web client, measures and reports page load time of web content 310 that has feature 318. Feature 318 is initially disabled.

Subset 320 has client users for which feature 318 is enabled. Although subset 320 is initially empty, in step 420 web system 300 enables feature 318 as a preface to adding client users to subset 320.

In step 430, web system 300 repeatedly adds client users to subset 320. For example, feature 318 is enabled for client user 322 because web system 300 adds client user 322 to subset 320.

In step 440, client instrumentation 316 sends timing report 340 to computing device 350. Timing report 340 indicates an amount of time that a web client spent loading web content 310. Timing report 340 also has a classifier of a client user.

In step 450, computing device 350 processes the classifier to determine whether feature 318 is enabled for the client user that sent timing report 340. Computing device 350 may determine whether or not a client user is in subset 320.

In some embodiments, implementation of step 450 may require some integration between computing device 350 and either client instrumentation 316 or a web server. An embodiment that does not implement step 450 may nonetheless proceed to step 460. An embodiment that does not perform step 450 might determine degradation degree 330 with less accuracy. For example, an embodiment that performs step 450 may determine degradation degree 330 as fifty percent degradation for feature-enabled client users. Whereas for the same scenario, an embodiment that does not perform step 450 may only be able to determine a degradation of five percent for all client users, regardless of feature enablement.

Per step 440, computing device 350 receives timing reports 340 from potentially many client users, of which only some have feature 318 enabled. In step 460, based on the many timing reports 340, computing device 350 calculates a degradation degree 330 that statistically quantifies an additional duration that browsers spend loading web content 310 if feature 318 is enabled for a client user.

From timing report 340, computing device 350 may calculate an average or a quantile, such as a median, of page load times during a given period for all client users in or not in subset 320. Demand for web content 310 may be naturally subject to a diurnal cycle. Computing device 350 may calculate a daily moving average or daily moving median of page load times.

Statistics involving a moving interval may require that computing device 350 be able to retain historical measurements. History retention also facilitates trend visualization, such as with a plotted time series. An implementation that lacks history may be limited to presenting only an instantaneous degradation degree 330. Absence of history can hinder trend analysis and forecasting while feature release is ongoing and hinder postmortem analysis.

In step 470, computing device 350 determines whether the degradation degree 330 exceeds threshold 332.

If threshold 332 is exceeded, then, in step 480, computing device 350 generates alert 334. Alert 334 may be an email, a text message, a log entry, a database record, or other indication that may trigger an automatic response such as routine mitigation or signal a need for manual observation, investigation, or intervention.

Subset Granularity

Figure 5:
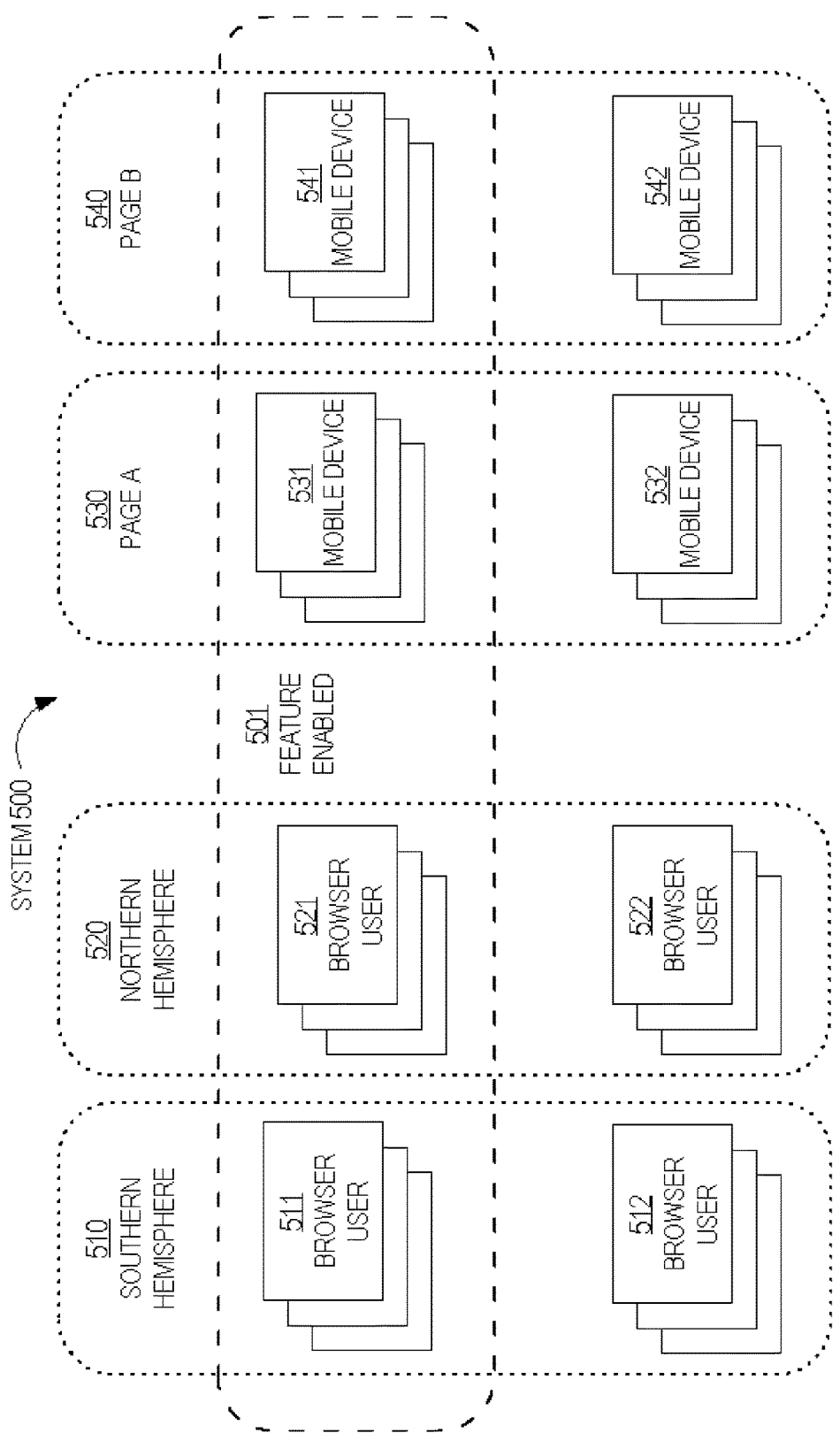
FIG. 5 is a block diagram that depicts a web system for detecting and alerting performance degradation during features ramp up, in an embodiment.

FIG. 5 is a block diagram that depicts a web system 500 for monitoring multiple subsets of browser users and client devices during releases of features, in an embodiment. Web system 500 may be an implementation of web system 100 or 300, although web systems 100 and 300 may have other implementations. Web system 500 includes browser users 511-512 and 521-522, and mobile devices 531-532 and 541-542. Although not shown, web system 500 has all of the components of web systems 100 and 300. For example web system 500 includes computing device 350.

Browser users 511-512 and 521-522 may be browser users 321-322. Mobile devices 531-532 and 541-542 may be examples of client devices 121-122. Mobile devices 531-532 and 541-542 are wireless computing devices such as a laptop, a smartphone, a smartwatch, or a mobile data terminal, such as an in-vehicle computer.

Network communication may cause a new feature to degrade the performance of a web page. For example, a new feature may have a network communication pattern that differs from an original communication pattern of a web page. A new feature may cause more data to be downloaded to a browser user. A new feature may cause more round trip communications between a client and one or more servers. Differences in network communication patterns may be exaggerated by differences in network infrastructure that depend on geographic location. For example, the global Internet is composed of backbones of different capacities and loads. Different points of client presence may have backhauls of different capacities and loads. Different access networks may have physical media and fronthauls of different capacities and loads.

Diversity of network infrastructure and load may be difficult to reproduce in a test laboratory. The performance suitability of a new feature in diverse locales may be difficult to predict prior to feature release. There may be a special need to monitor a performance degradation of a new feature according to geography. Although subset 501 tracks feature enablement, further decomposition of a user audience can meaningfully increase visibility into geographic performance.

For example, hemisphere subset 510 has browser users 511-512 that reside in the southern hemisphere of the earth. Hemisphere subset 520 has browser users 521-522 that reside in the northern hemisphere. Hemisphere subsets 510 and 520 have a mix of browser users, only some of which load a web page with a new feature enabled. Web system 500 may use user geolocation to decide which browser users belong in which of hemisphere subsets 510 and 520. Mechanisms of user geolocation include satellite global positioning system (GPS), Wi-Fi positioning, IP address, route tracing, base station connectivity, and terrestrial positioning based on signal fade or delay such as triangulation or multilateration.

Although hemisphere subsets 510 and 520 are shown, geographic subdivisions of arbitrary size and quantity may be used. Because geographic differences in browser performance are expected, for each geographic subset 510 and 520, web system 500 may use a different threshold when determining whether to send a geographic-specific performance degradation alert.

Geography is not the only source of network-dependent browser performance. Mobile devices often connect to a network over an access link of limited capacity, such as a cellular telephony link. Wireless links are prone to noise, fade, shadows, and saturation. A mobile device may also lack adequate processing capacity. There may be a special need to monitor a performance degradation of a new feature according to mobility.

A feature may reside on multiple web pages. Performance degradation of a feature may vary between different web pages that have the feature. There may be a special need to monitor a performance degradation of a new feature according to multiple web pages.

In one embodiment, web pages A and B are different, but both have a same feature. Page subset 530 has mobile devices 531-532 that load web page A. Page subset 540 has mobile devices 541-542 that load web page B. Page subsets 530 and 540 have a mix of mobile devices, only some of which load a web page with a new feature enabled. Mobile devices are self-selecting for inclusion in page subsets 530 and 540 because the user of a client device decides whether to load page A or page B.

As in web system 300, client devices send performance data that has a user classifier. In web system 500, a user classifier either has an indication of which web page A or B was loaded, or web system 500 may deduce which web page by further processing of a user classifier. Because differences are expected in browser performance based on which web page is loaded, for each of page subset 530 and 540, web system 500 may use a different threshold when determining whether to send a page-specific performance degradation alert.

In another embodiment and although not shown, there are multiple, (for example, two) new features on one web page. Web system 500 may enable both features for browser users. If web system 500 detects a significant performance degradation, web system 500 may have difficulty determining which of the two features causes the degradation, because both features are enabled on the same web page for the same users.

An alternative mode is for web system 500 to enable each of the two new features for mutually exclusive subsets 530 and 540 of browser users, such that no user has both features simultaneously enabled. Each of the two mutually exclusive subsets of browser users would report its own performance data to web system 500. Web system 500 may process a user classifier included within performance data sent by each browser to determine which web page the browser loaded. Because differences are expected in browser performance based on which feature is loaded, for each of page subset 530 and 540, web system 500 may use a different threshold when determining whether to send a feature-specific performance degradation alert.

Bottleneck Diagnosis

Figure 6:
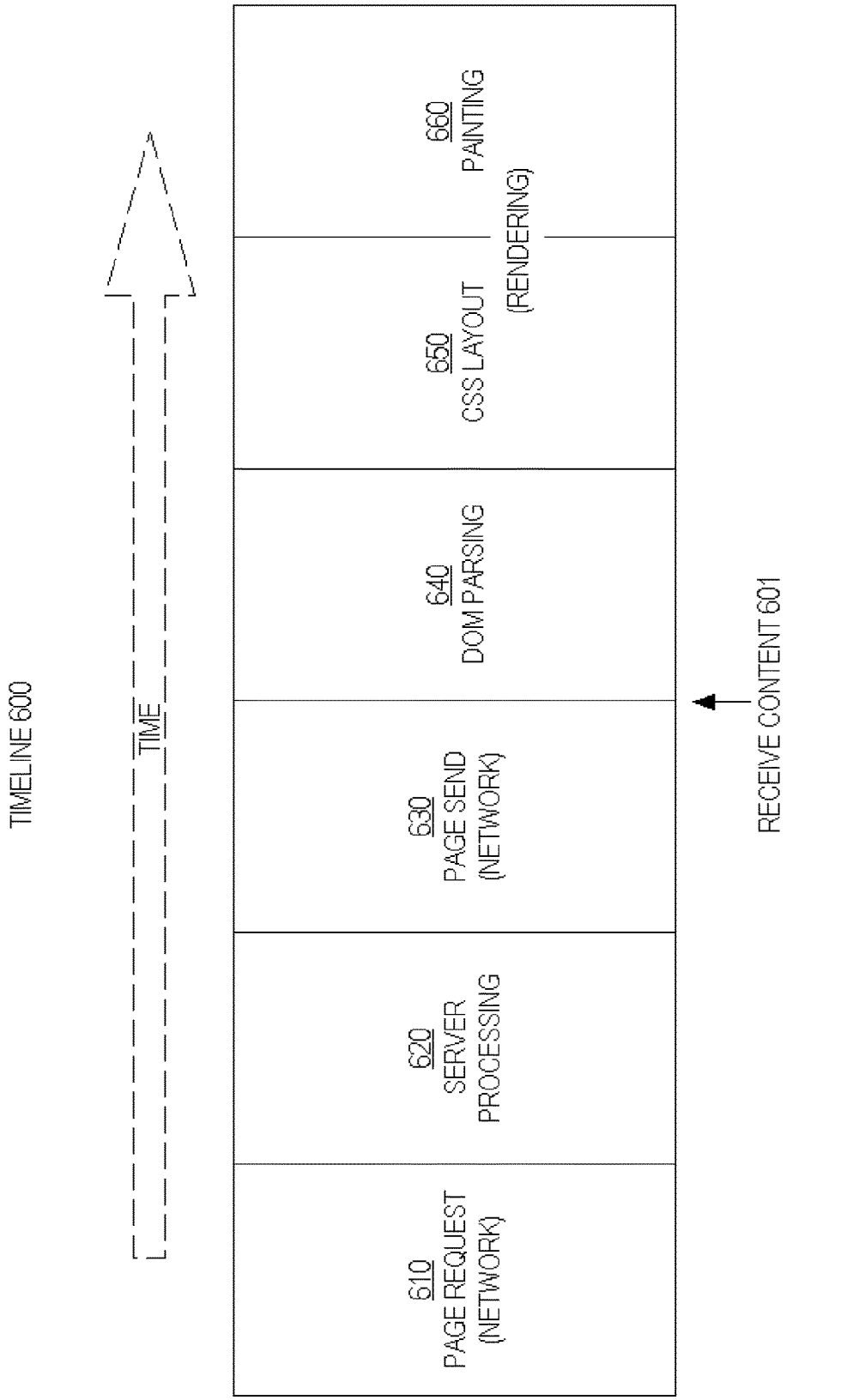
FIG. 6 depicts a timeline of phases of web page loading, in an embodiment.

FIG. 6 depicts timeline 600 of operational phases that occur during page loading, in an embodiment. A performance degradation alert by itself may be insufficient to troubleshoot performance degradation by a new feature. Troubleshooting may require knowledge of which phases of page loading consume excessive time. The world wide web consortium (W3C) defines navigation timing as a detailed model of page load timing, which is simplified in timeline 600. Timeline 600 includes phases 610, 620, 630, 640, 650, and 660. Theses phases represent durations, but are not drawn to scale and do not represent identical durations.

The first phase of page loading is page request 610, when a web browser connects to a web server (which may include establishing a TCP connection) and issues a request to retrieve a web page. During server processing 620, the web server receives and handles the request, including dynamic content generation. At page send 630, the web server transfers the web page to the web browser. Phases 610 and 630 measure network latency. Eventually the web page arrives at the web browser, shown as receive content 601. The web browser performs document object model (DOM) parsing 640 on the web page. After parsing, the web browser renders the web page, which includes cascading style sheet (CSS) layout 650 and screen painting 660.

A report of a page load time by a web browser may include measured durations of those loading phases individually or as partial sums. An alert threshold, a diagnostic investigation, or other decision may regard a particular loading phase or some subsequence of phases. To isolate network performance, phases before receive content 601 and especially phases 610 and 630 are relevant. To measure the performance of browser machinery, phases following receive content 601 are relevant.

Not all time spent loading a web page is relevant to a user experience. For example, a web page may be too big to fit entirely within the viewport of a browser. Page content positioned outside of the viewport is invisible without scrolling. In some implementations, time spent retrieving, parsing, and laying out invisible content does not degrade a user experience. Measurement of performance degradation more accurately reflects an impact on a user experience if the measurement only regards visible content. Page content that is initially visible without scrolling is considered to be "above the fold." If user experience is a primary concern, then client instrumentation may report time spent loading and rendering page content that is above the fold.

Duration is not the only performance quantity relevant to a user experience during page loading. An impatient user may abandon a web page before its loading finishes, usually by abruptly returning to a prior web page. Pressing a back button on a web browser accomplishes back navigation. Client instrumentation may report such back navigation during page loading. A statistical impact of performance degradation on a user experience may incorporate an amount of back navigation. An alert threshold, a diagnostic investigation, or other decision may regard an amount of back navigation.

Ramp Up Scheduling

A web system may ramp up a feature by growing a variant subset of feature users according to an automatic schedule. For example, a web system may achieve linear ramp up by enabling a feature for additional users at a rate of a fixed amount of users per time increment. A linear schedule may be suboptimal due to lack of sensitivity to goals of ramp up.

When ramp up begins, feature risk is greatest because knowledge of a performance impact is limited to laboratory testing. Because risk is high, ramp up may limit harm by initially enabling a feature for a small subset of browser users. Harm may be further avoided with careful initial selection of browser users. For example, ramp up may begin by selecting only employees and/or close business partners for inclusion in a feature-enabled subset of browser users.

Because of the statistical nature of performance measurement, when a feature-enabled subset of browser users is initially small, more time may be needed to achieve sufficient page loads for a performance trend to appear. Ramp up may be better suited by an automatic schedule that is not linear. Early in ramp up, a schedule may slowly add small increments of users to allow time for careful monitoring of performance degradation. During this phase, performance may be unstable, and a significant performance degradation might not manifest until enough users are feature-enabled. In case of extreme degradation as defined by a threshold, a web system may suspend an automatic schedule or cancel the schedule and disable an offending feature.

Eventually a degradation trend may emerge, such as a stable plateau of performance that is not disturbed by frequent additions of many users. Once performance stability is observed, risk may shift from a diminishing possibility of performance degradation to an increasing possibility of audience awareness that a released feature is not yet generally available and that a web site is essentially inconsistent across a wide audience. When this shift occurs, a new goal may be to ramp up quickly to minimize public confusion or consolidate technical support.

How nonlinearity of scheduling is achieved depends on an implementation. Nonlinearity may occur according to a fixed schedule such as parabolic or exponential growth. Greater sensitivity to evolving conditions may be achieved with a dynamic schedule. A dynamic schedule may entail a combination of thresholds and step functions to achieve different growth rates for different conditions. Feedback between performance degradation and subset size or growth rate may be formulaic.

For example, a dynamic schedule may be configured to match a growth rate to a stability of performance. A schedule may cause growth of a feature-enabled subset that is inversely proportional to an increase in a degradation degree. This lets a web system grow a feature-enabled subset of browser users during periods when performance degradation is not increasing. Such a schedule also lets a web system carefully monitor an increasing performance degradation while holding a feature-enabled subset somewhat constant.

A schedule may cause growth of a feature-enabled subset that is inversely proportional to a volatility of a degradation degree, regardless of whether the degradation is increasing or decreasing. This enforces achievement of a performance plateau before growing a feature-enabled subset. It also suspends subset growth when the plateau is lost.

Figure 7:
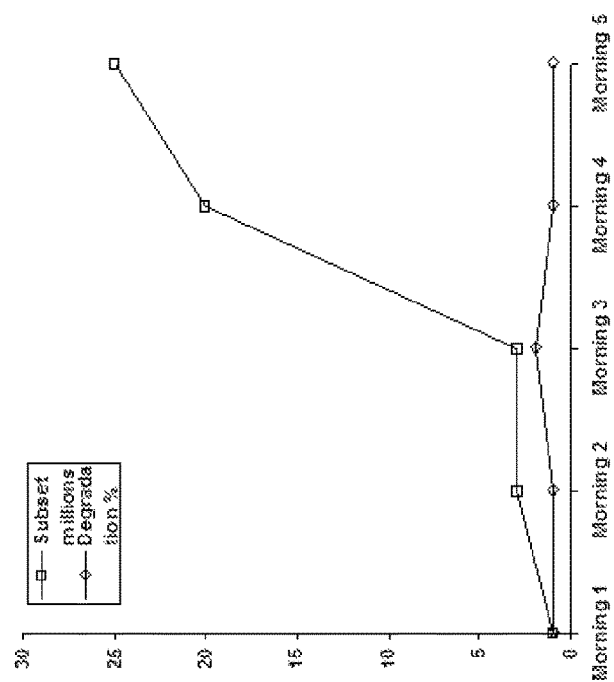
FIG. 7 depicts charts of performance degradation during features ramp up, in an embodiment.
Figure 7:
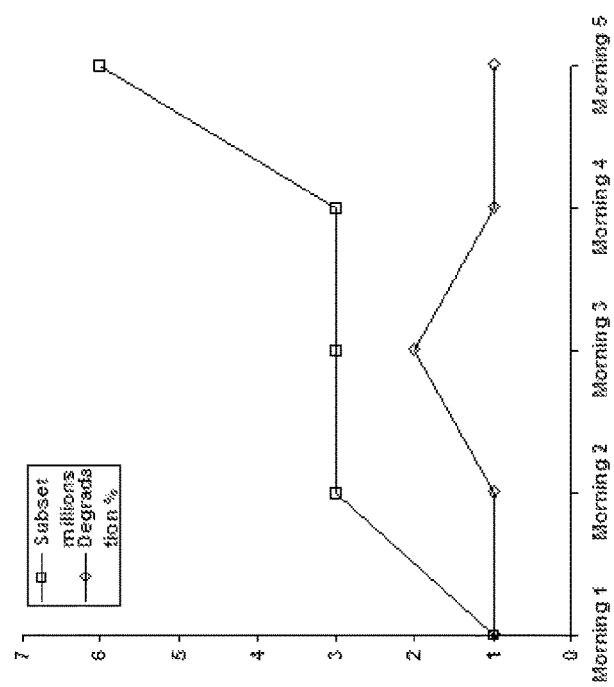

FIG. 7 depicts charts A and B that track performance degradation during automatic ramp up, in an embodiment. The horizontal axis of both charts shows days elapsed. The start of each day is marked as a morning on the horizontal axis.

Both charts have a curve that tracks feature-enabled subset size and a curve that tracks performance degradation. Although the scale of the vertical axes of charts A and B are dissimilar, both charts show the same curve of performance degradation that peaks at 2% during morning 3. However the subset size curves differ between the charts because the charts exhibit subset growth according to different dynamic schedules.

Chart A shows a cautious schedule that scales subset growth according to low volatility of performance degradation. During the second and third days of chart A, performance degradation is unstable, and an automatic schedule accordingly suspends subset growth during the second and third days. A result is that at the start of the fifth day, the cautious schedule has achieved a subset size of only six million browser users. Chart B achieves 25 million browser users in the same time with the same performance degradation curve, because its automatic schedule allows subset growth so long as performance degradation is not increasing, even if performance is unstable.

Hardware Overview

According to one embodiment, the techniques described herein are implemented by one or more computing devices. The computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such computing devices may also combine custom hard-wired logic, ASICs, or FPGAs with custom programming to accomplish the techniques. The computing devices may be desktop computer systems, portable computer systems, handheld devices, networking devices or any other device that incorporates hard-wired and/or program logic to implement the techniques.

Figure 8:
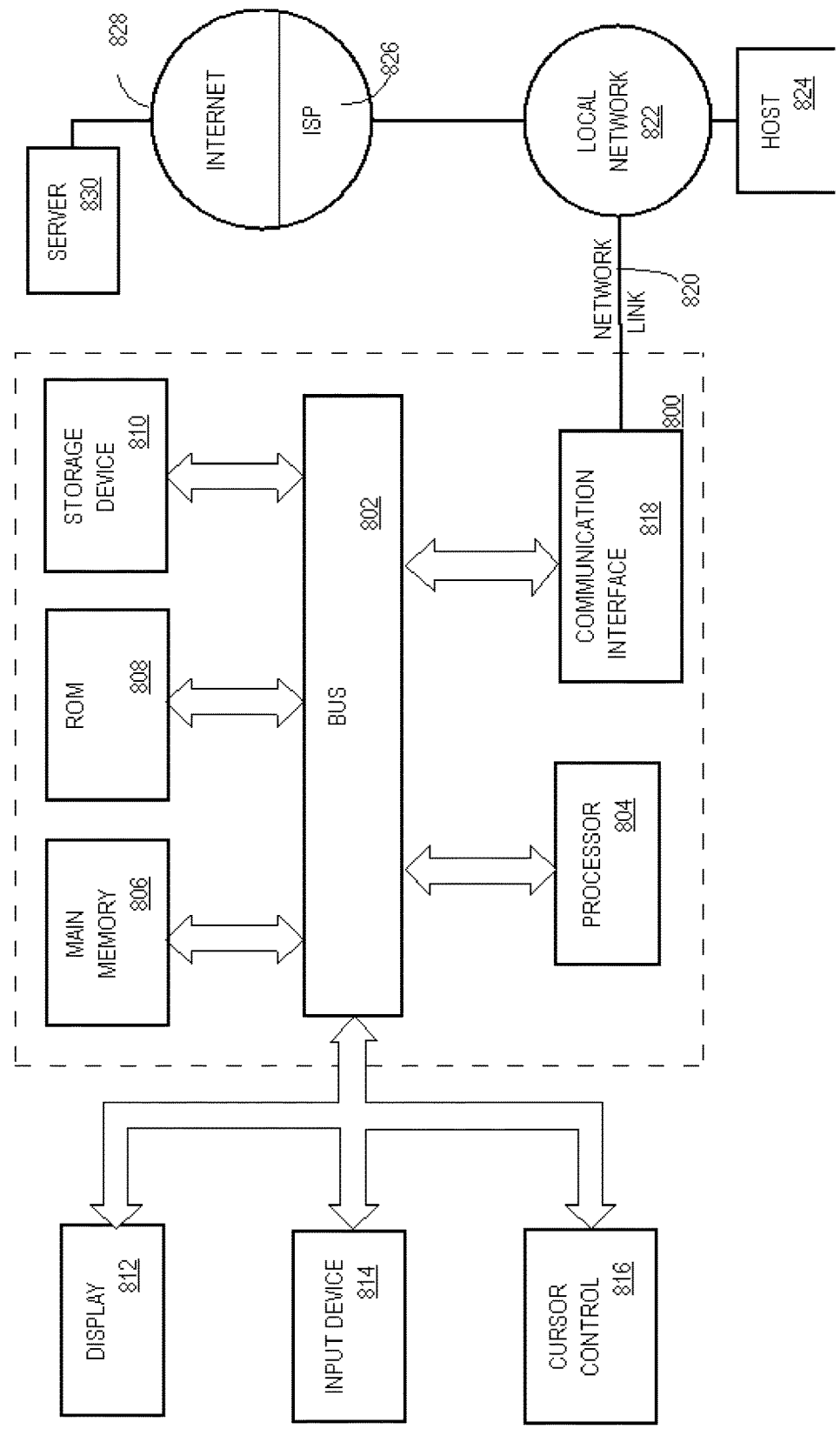
FIG. 8 depicts a computer system upon which an embodiment may be implemented.

For example, FIG. 8 is a block diagram that illustrates a computer system 800 upon which an embodiment of the invention may be implemented. Computer system 800 includes a bus 802 or other communication mechanism for communicating information, and a hardware processor 804 coupled with bus 802 for processing information. Hardware processor 804 may be, for example, a general purpose microprocessor.

Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Such instructions, when stored in non-transitory storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, such as a magnetic disk or optical disk, is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

Computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 810. Volatile media includes dynamic memory, such as main memory 806. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
    sending a first version of web content to a first plurality of client devices, wherein the first version of the web content does not include a particular feature;
    receiving, from each client device of the first plurality of client devices, first performance data that indicates performance of said client device with respect to processing the web content;
    sending a second version of the web content to a second plurality of client devices that is different than the first plurality of client devices, wherein the second version of the web content includes the particular feature;
    receiving, from each client device of the second plurality of client devices, second performance data that indicates performance of said client device with respect to processing the web content;
    comparing the first performance data with the second performance data to determine a difference between a processing metric associated with the first version of the web content and a processing metric associated with the second version of the web content;
    wherein the method is performed by one or more computing devices.

2. The method of claim 1 wherein the processing metric associated with the first version and the processing metric associated with the second version comprise a statistic of content load times.

3. The method of claim 1 wherein sending the first version of web content comprises sending the first version to a software application that is not a web browser.

4. The method of claim 1 wherein the first version of web content comprises JavaScript that generates the first performance data.

5. The method of claim 1 further comprising visually plotting a time series derived from at least one of: the first performance data or the second performance data.

6. The method of claim 1 wherein the first plurality of client devices comprises at least one of: a laptop, a smartphone, a smartwatch, or an in-vehicle computer.

7. The method of claim 1 wherein receiving the first performance data from each client device comprises obtaining a geolocation of the client device based on at least one of: satellite global positioning system (GPS), Wi-Fi positioning, an IP address, route tracing, base station connectivity, terrestrial positioning based on signal fade or delay, triangulation, or multilateration.

8. The method of claim 1 wherein a client device of the first plurality of client devices decides whether to request the first version of the web content or the second version of the web content.

9. One or more non-transitory computer-readable media storing instructions that, when executed by one or more processors, cause:
    sending a first version of web content to a first plurality of client devices, wherein the first version of the web content does not include a particular feature;
    receiving, from each client device of the first plurality of client devices, first performance data that indicates performance of said client device with respect to processing the web content;
    sending a second version of the web content to a second plurality of client devices that is different than the first plurality of client devices, wherein the second version of the web content includes the particular feature;

receiving, from each client device of the second plurality of client devices, second performance data that indicates performance of said client device with respect to processing the web content;

comparing the first performance data with the second performance data to determine a difference between a processing metric associated with the first version of the web content and a processing metric associated with the second version of the web content.

10. The one or more non-transitory computer-readable media of claim 9 wherein the processing metric associated with the first version and the processing metric associated with the second version comprise a statistic of content load times.

11. The one or more non-transitory computer-readable media of claim 9 wherein sending the first version of web content comprises sending the first version to a software application that is not a web browser.

12. The one or more non-transitory computer-readable media of claim 9 wherein first version of web content comprises JavaScript that generates the first performance data.

13. The one or more non-transitory computer-readable media of claim 9 wherein the instructions further cause visually plotting a time series derived from at least one of: the first performance data or the second performance data.

14. The one or more non-transitory computer-readable media of claim 9 wherein the first plurality of client devices comprises at least one of: a laptop, a smartphone, a smartwatch, or an in-vehicle computer.

15. The one or more non-transitory computer-readable media of claim 9 wherein receiving the first performance data from each client device comprises obtaining a geolocation of the client device based on at least one of: satellite global positioning system (GPS), Wi-Fi positioning, an IP address, route tracing, base station connectivity, terrestrial positioning based on signal fade or delay, triangulation, or multilateration.

16. The one or more non-transitory computer-readable media of claim 9 wherein a client device of the first plurality of client devices decides whether to request the first version of the web content or the second version of the web content.

17. A system of one or more computers comprising:
one or more memories configured to store at least one of: web content or performance data;
one or more processors, wherein each processor of the one or more processors is connected to at least one memory of the one or more memories and configured to:
send a first version of web content from the memory to a first plurality of client devices, wherein the first version of the web content does not include a particular feature;
receive, into the memory, from each client device of the first plurality of client devices, first performance data that indicates performance of said client device with respect to processing the web content;
send a second version of the web content to a second plurality of client devices that is different than the first plurality of client devices, wherein the second version of the web content includes the particular feature;
receive, from each client device of the second plurality of client devices, second performance data that indicates performance of said client device with respect to processing the web content;
compare the first performance data with the second performance data to determine a difference between a processing metric associated with the first version of the web content and a processing metric associated with the second version of the web content.

18. The system of claim 17 wherein the processing metric associated with the first version and the processing metric associated with the second version comprise a statistic of content load times.

19. The system of claim 17 wherein send the first version of web content comprises send the first version to a software application that is not a web browser.

20. The system of claim 17 wherein a client device of the first plurality of client devices decides whether to request the first version of the web content or the second version of the web content.

* * * * *